United States Patent [19]

Perez

[11] Patent Number: 4,740,668
[45] Date of Patent: Apr. 26, 1988

[54] METHOD AND APPARATUS FOR CUTTING SHEET MATERIAL USING PLASMA ARC CUTTING TOOL

[75] Inventor: Bernardo A. Perez, Madrid, Spain

[73] Assignee: Investronica, S.A., Madrid, Spain

[21] Appl. No.: 844,827

[22] Filed: Mar. 27, 1986

[30] Foreign Application Priority Data

Apr. 1, 1985 [ES] Spain .................................. 541.826

[51] Int. Cl.[4] .............................................. B23K 9/00
[52] U.S. Cl. ....................... 219/121 PC; 219/121 PX; 219/121 PY; 219/121 LG; 219/121 LN; 219/121 LY; 219/121 PH; 83/373
[58] Field of Search ................ 219/121 PY, 121 PC, 219/121 PH, 121 PX, 158-161, 121 LG, 121 LN, 121 LY; 83/177, 370, 371, 364, 365, 373

[56] References Cited

U.S. PATENT DOCUMENTS

| | | | |
|---|---|---|---|
| 3,764,775 | 10/1973 | Hasslinger et al. | 219/121 LG |
| 3,784,183 | 1/1974 | Castro et al. | 219/121 LG |
| 4,393,296 | 7/1983 | Dompas | 219/121 PX |
| 4,544,824 | 10/1985 | Knutsson | 219/121 LG |
| 4,553,016 | 11/1985 | Kunii et al. | 219/121 PC |

*Primary Examiner*—M. H. Paschall
*Attorney, Agent, or Firm*—Wenderoth, Lind & Ponack

[57] ABSTRACT

An apparatus for cutting parts out of a sheet of material including a cutting table, an endless gas permeable conveyor movable in a feed direction along the cutting table for supporting the sheet material thereon, a suction box for applying a vacuum to the conveyor and holding the material firmly against the conveyor during a feeding step and a cutting step, a plasma arc cutter for cutting parts from the material supported on the conveyor and a carriage for supporting the plasma arc cutter and moving it along pattern coordinates of the parts. A brake is mounted on the carriage for selectively engaging the conveyor with the carriage to thereby selectively advance the conveyor along the feed direction. A controller stores pattern coordinates of the parts and controls movement of the carriage and actuation of the brake. The carriage is controlled by the controller to move a distance in a feed direction which is greater than the length of the feed direction of the longest part to be cut from the sheet material during a cutting step. Also, the controller actuates the brake to release engagement between the carriage and the conveyor so that the carriage can be controlled by the controller to move the plasma arc cutter along pattern coordinates of the parts. The apparatus also includes labeling and pickup apparatus located downstream from a cutting zone on the cutting table.

16 Claims, 9 Drawing Sheets

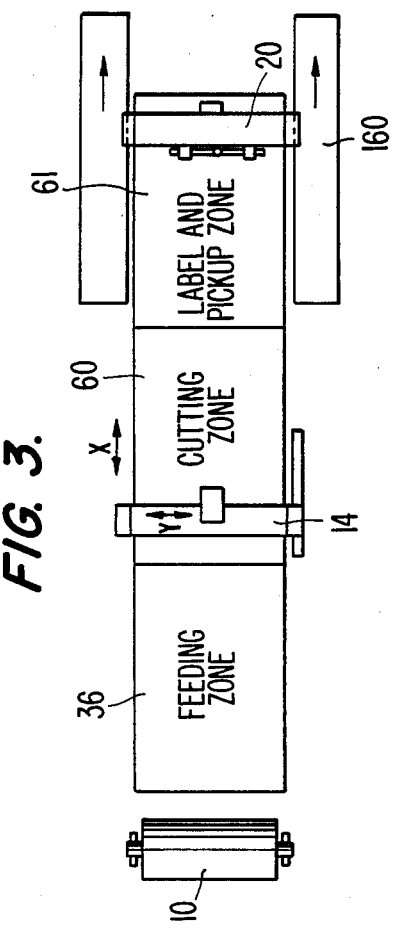
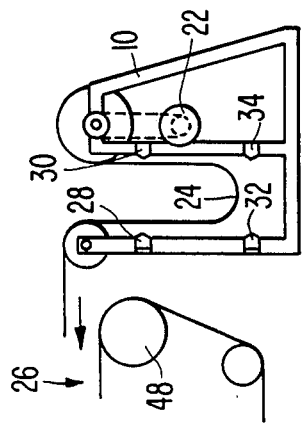
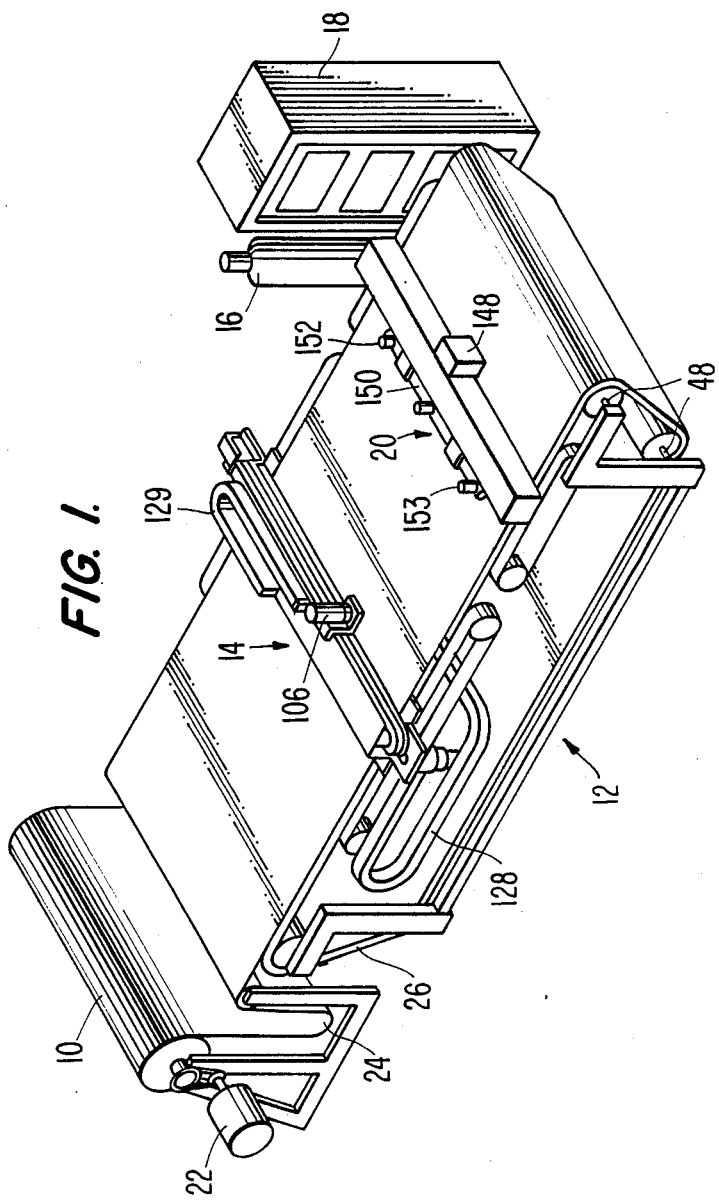

METHOD AND APPARATUS FOR CUTTING SHEET MATERIAL USING PLASMA ARC CUTTING TOOL

BACKGROUND OF THE INVENTION

Field of the Invention

The present invention provides a method in which a N.C. machine is provided to cut sheet material like cloth, paper, cardboard, plastic, plywood, wood and similar materials with a thickness of up to 15 mm. The raw material can be available in roll form or in laminate planar form.

SUMMARY OF THE INVENTION

To feed material from a roll to the cutting area a motorized support is provided, in a way to prevent the material from stretching or being distorted before being cut on the table.

In order to have maximum throughput from the machine, the cutting table is a conveyor made of an air and gas permeable material, and is divided into three areas including a feeding area, a cutting area and a removing area. The conveyor is prevented from moving during cutting and is movable by an X carriage without changing the position with respect to each other during the feeding operation.

In each of the cutting and removing areas is an X-Y computer controlled assembly. In the cutting area a plasma jet cutter is managed by one X-Y assembly which allows the cutting beam to reach every point of the conveyor surface. The power supply and a tank for the gas to be transformed into plasma are in a stationary position and the beam path is conveniently protected. The lower side of the feeding and cutting area is continuously removed in order to prevent motion of the material to be cut and in order to remove smoke and other products that result from the cutting process. Another aspect of this suction box is to dissipate the energy of the plasma jet beam.

In the removing area is placed the other X-Y computer controlled assembly which includes a head provided with a labelling and a suction device in order to automatically label and pick-up the cut parts and bring them to a storage area.

Since normally the minimum length of the pattern necessary to make a complete suit is about 5 to 7 m., and, due to the simultaneity of the cutting and removing operation the length of the two areas must be the same, a machine to be able to cut the entire pattern at once would be extremely long. To avoid the problem, the system of the present invention is provided with a controller to cut the pattern is sections, normally named "windows" but, more importantly, "variable windows" in order to cut the patterns falling completely into the cutting area. In this way it is possible to have the length of the window slightly larger than the longest part to be cut.

BRIEF DESCRIPTION OF THE DRAWINGS

FIG. 1 illustrates a schematic perspective of the machine of the present invention in which it is possible to execute the process of the present invention;

FIG. 2 is a schematic of the feeding device;

FIG. 3 is a top plan view of the layout of the machine shown in FIG. 1;

DETAILED DESCRIPTION OF THE INVENTION

Figure 4:
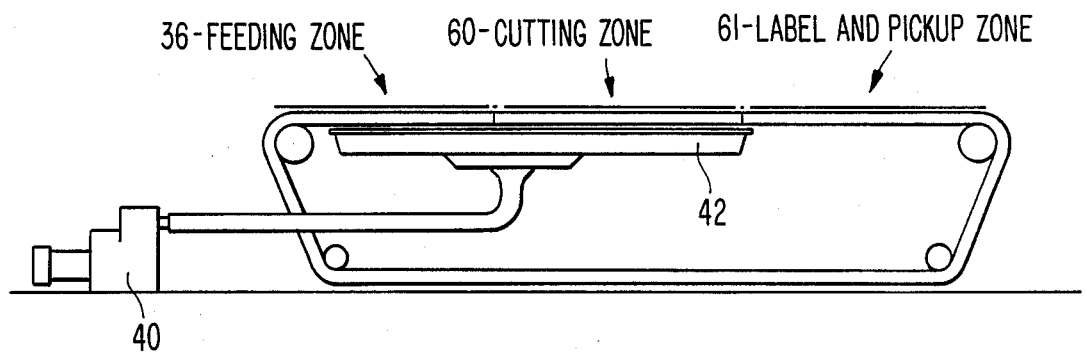
FIG. 4 is a side view detail of the suction box.

FIG. 1 shows a general sketch of the machine which includes a feeding assembly 10, a cutting machine 12 with a X-Y cutter assembly 14, a power supply and controller 18 and a labelling and removing device 20.

The raw material can be supplied in roll form or in laminate form, as mentioned above, but for the purpose of the following description, the raw material will be in roll form in order to make reference to the features of the feeding group. One of the main characteristics of cloth or similar materials is that they are deformable and that if a part is fed over the cutting surface with some residual stretching tension, due to friction between the material and the surface, the material will retain some deformation and if in this situation a part is cut, when it is taken off the cutting surface it will shrink to smaller dimensions and consequently it will not fit the form desired. To avoid this problem, the feeding mechanism 10 of the present invention is provided with a motor 22 in order to rotate the roll of material. Between the roll and the cutting machine 12 an isolating loop 24 is provided in order to prevent any tension of the cloth as it is taken up and carried by a conveyor 26, since the tension due to only the weight of the loop is very small. For this purpose, when the conveyor 26 is moving in the feed direction indicated by the arrow in FIG. 2, the loop 24 will decrease until loop detection means, such as devices 28 and 30 comprising, for instance a photocell, will be activated and in turn will activate the motor 22 to make the size of the loop larger until it reaches another loop detection means, such as a pair of sensors 32 and 34, normally uncovered, causing the deactivation of the motor 22.

When the machine is at the beginning of an operation (during loading), a small quantity of material is led over a feeding zone 36 (FIGS. 3 and 4) and a vacuum generator or pump 40 is switched on to produce a vacuum in a suction box 42 and through the cutting surface of the conveyor 26 which is made of an air permeable material. This gentle vacuum will suffice to prevent any misplacement between the conveyor 26 and the material and the machine will be loaded by means of the same movement of the conveyor.

A special brush like 46 surface has proven to be an excellent cutting surface. The cutting surface can be made up of steel filaments of 0.3 mm in diameter and approximately 30 mm. in length, with a density of 75 wires/cm$^2$. When using a plasma torch, there is a dispersive effect on the gas made by the top end of a brush surface made with thicker wire, and as a result a clean cut can not be obtained.

Figure 5:
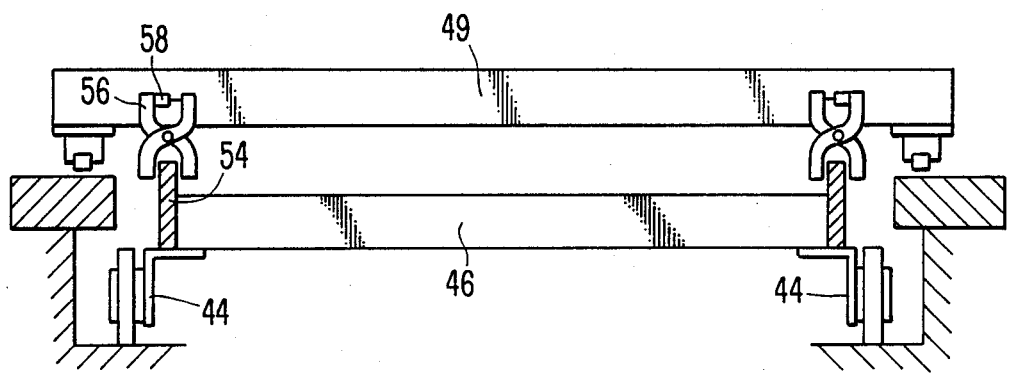
FIG. 5 is a schematic end view of means for connecting the X carriage to the conveyor cutting base.
Figure 6:
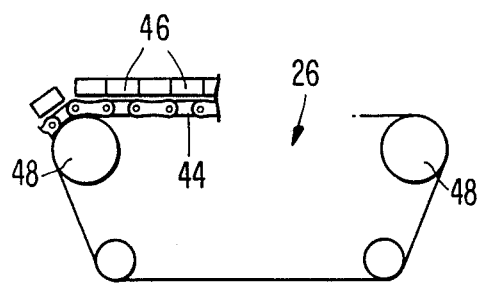
FIG. 6 is a schematic side view of the conveyor cutting base.
Figure 7:
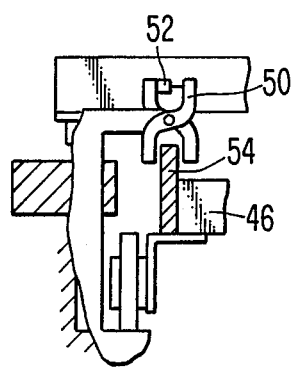
FIG. 7 is a schematic end view of the brake used to prevent the cutting base from moving during a cutting operation.

As shown in FIGS. 5 and 6, the machine includes movable endless chains 44 on either side thereof and each chain rotates around toothed wheels 48 at both ends of the machine. A corresponding pair of wheels 48 are provided on both sides of the table and mounted rigidly with it, but each pair rotates freely. There is no motor to move the conveyor because this is done by means of an X carriage 49 as will be explained later. It is necessary to provide some kind of brake means to prevent motion of the conveyor during the cutting operation, while permitting the conveyor to move freely when it is engaged to the X carriage. For this purpose, a first brake 50 (shown in FIG. 7) is provided on a fixed portion of the machine and actuator means 52 associated with the first brake 50 operates in a manner such that, during cutting, the first brake 50 brakes the conveyor 26 by engaging an upwardly extending flange 54 thereon. The flange 54 can also be used to engage the conveyor 26 to the X carriage 49.

A second brake 56, similar to the brake 50, is mounted on the X carriage 49 (FIG. 5). When it is necessary to move the conveyor, in order to put new material into the cutting area, the actuator means 52 releases the first brake 50 and actuator means 58 operates the second brake 56 fixed to the X carriage to engage the flange 54 such that when the X carriage moves, the conveyor moves by exactly the same amount and, as will be seen, the controller 18 will be able to precisely correct the amount of movement by coordinates sent to position servos of X and Y carriages of the X-Y cutter assembly 14.

Figure 8:
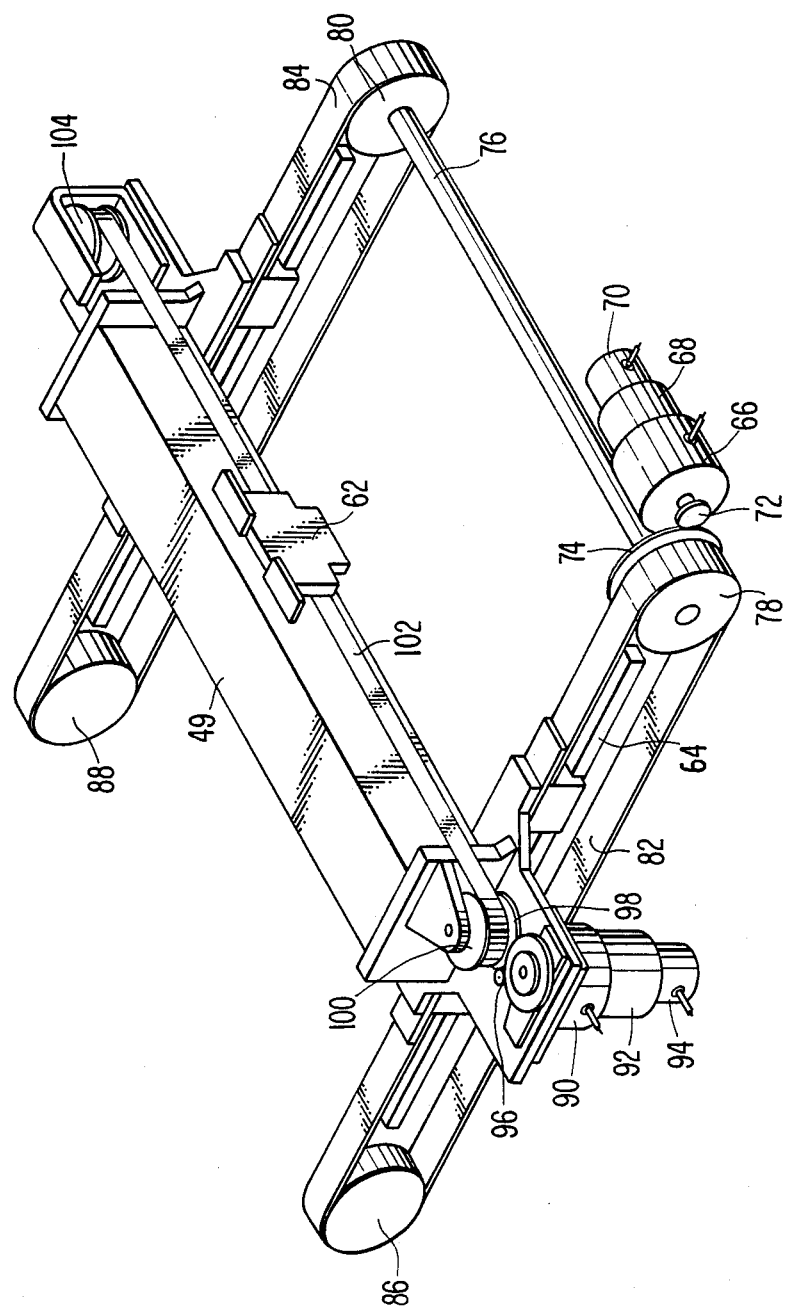
FiG. 8 is a perspective view of the X-Y cutting assembly.

The X-Y assembly 14 is moved over a cutting zone 60. As indicated in more detail in FIG. 8, the X-Y assembly is composed of the X carriage 49 and a Y carriage 62. The X carriage 49 extends perpendicularly to guide rails 64 which are parallel to the feed direction of the conveyor and the direction of movement of the Y carriage is perpendicular to the direction of movement of the X carriage. Both carriages have the same principle of operation so only that of the X carriage will be described. An X motor 66 is mounted at one end of the cutting zone 60 and the motor 66 is connected to a tachometer 68 and a position transducer 70 is the actuator of a position servo loop. The motor 66 moves the X carriage by means of a reduction gear which engages a gear 74 mounted on a shaft 76 which extends across the cutting zone. Opposite ends of the shaft 76 support toothed pulleys 78, 80 which in turn support toothed belts 82, 84 maintained in tension by means of pulleys 86, 88. The X carriage 49 is bolted the belts 82, 84 for movement therewith. Mounted on one end of the X carriage 49 is an assembly of a Y motor 90, tachometer 92, and position transducer 94 for rotating a gear 96 engaged with another gear 98 attached to a drive pulley 100. A belt 102 extends around the drive pulley 100 and a tension pulley 104 mounted on an opposite end of the X carriage to move the Y carriage 62. A signal to command the X and Y loop comes from the controller 18, as will be explained later.

Figure 9:
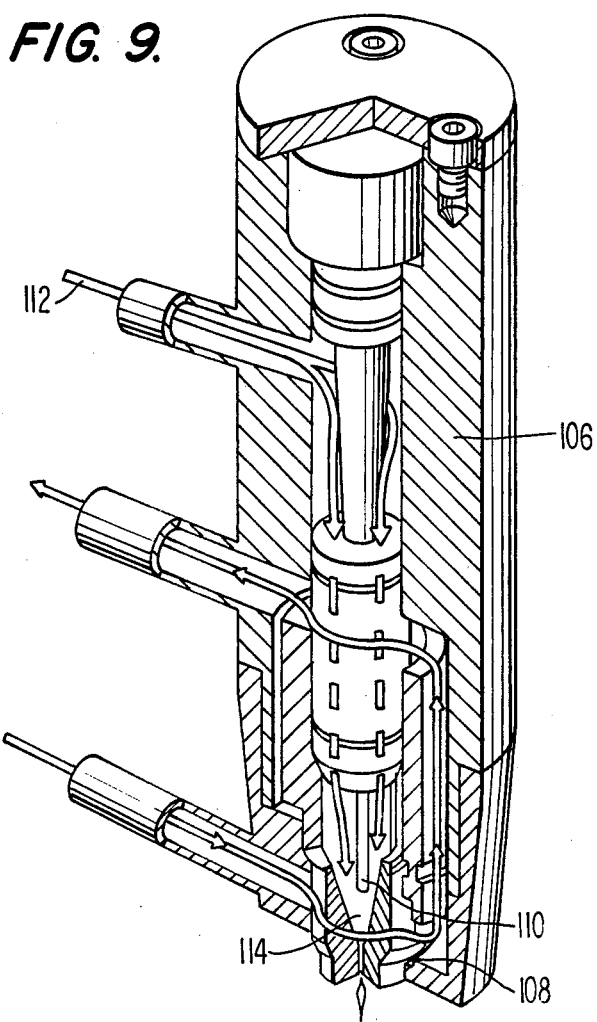
FIG. 9 is a perspective view in section of the plasma generator head.
Figure 10:
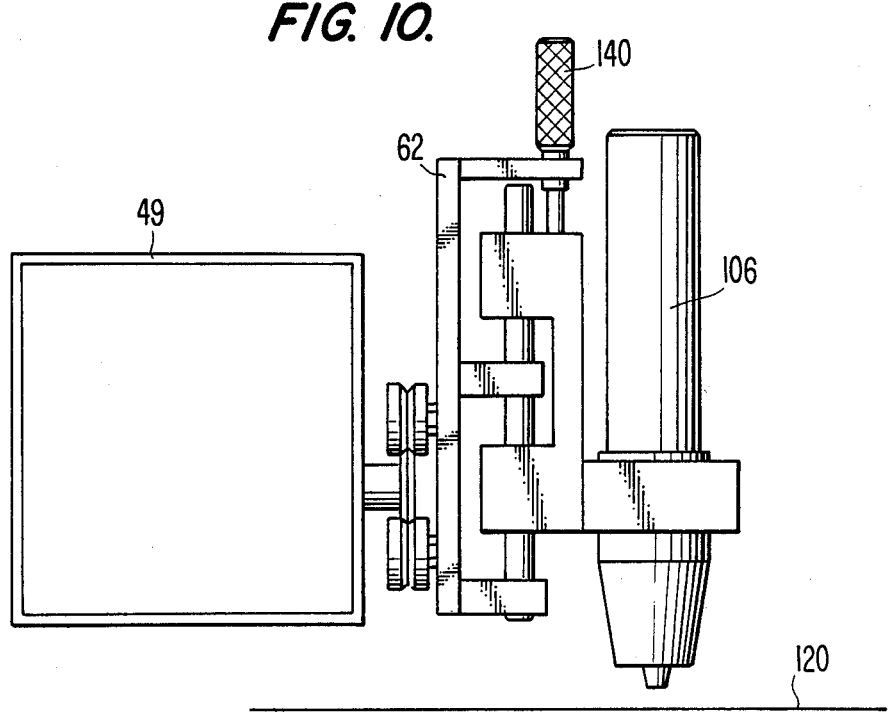
FIG. 10 illustrates the manner in which the plasma generator head is mounted on the X-Y assembly.

As a cutting tool, a plasma jet is used which is mounted on the X-Y assembly as shown in FIG. 10. FIG. 9 shows for purposes of illustration, a section of a plasma generating head used as a cutting head 106. In the area between an anode 108 and cathode 110 an electric discharge is produced which heats argon and/or nitrogen gas introduced into the head from a tank 16 through an inlet 112. A discharge chamber is cooled by circulating water 114. The result is a supersonic jet having a velocity of Mach 2 and a temperature in the range of 10000°–20000° C., a jet having a diameter of about 0.7 mm and a length of 5–10 mm. The power in the jet is up to 3 Kw. There is no fire risk since the jet is created from inert gas.

This tool, unlike other already used devices like lasers, allows an extremely easy management of the cutting beam, since it is formed directly in the cutting head 106, by means of pressurized inert gas conducted though a hose running in guides 128 and 129 (as shown in FIG. 1), and brought to a plasma state by means of an electric arc generated in the head itself.

Since the plasma jet generator is known to the skilled artisans, the essence of the present invention is the application of the plasma jet cutting head on the described X-Y N.C. machine for the cutting of sheet material up to a thickness of 15 mm.

The plasma jet beam can be interrupted in response to signals from the control panel of controller 18, such that cutting is not performed when the cutting head 106 is moving over a segment of the material which must not be cut. Another advantage of this cutting head is that, unlike lasers, there are no invisible radiations which are dangerous for the machine operators. Also, within 10 mm from the end of the cutting head nozzle, the plasma flame is completely dissipated, minimizing any possible risk of causing a fire.

Figure 11:
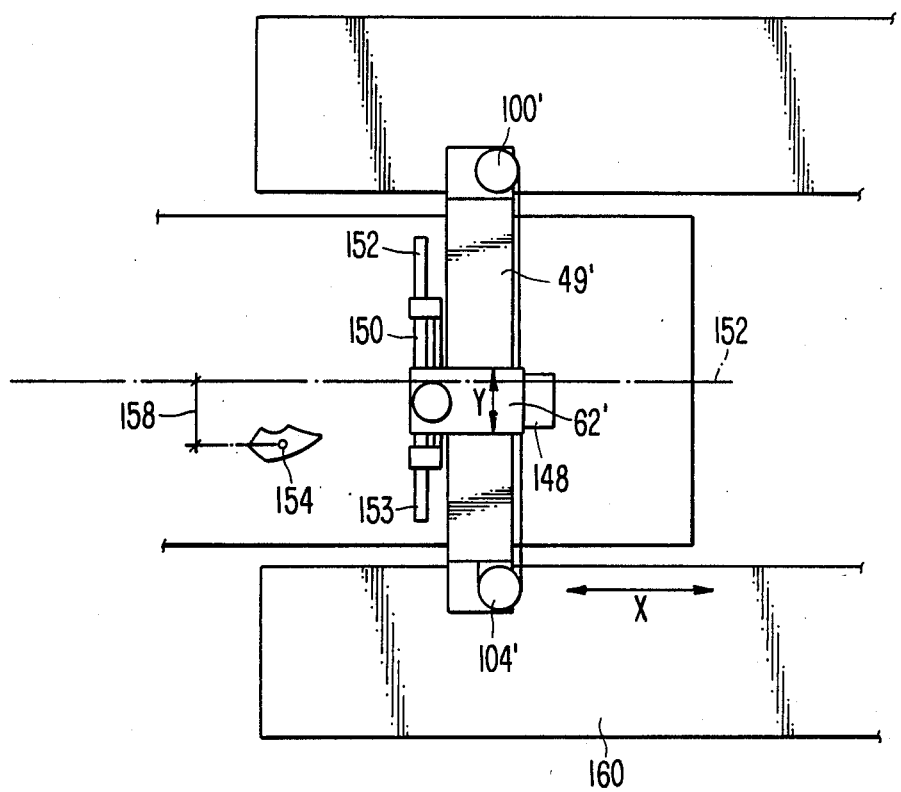
FIG. 11 is a plasma schematic view of the labelling and removing.

The labelling and removing device 20 is positioned in a label and pickup zone 61 and is an assembly which is similar to the previously described X-Y assembly 14 but in place of the plasma jet cutting head 106, a labelling head assembly 148 is mounted on a Y carriage 62'. As can be seen in FIG. 11, the labelling head assembly 148 is mounted on one side of an X carriage 49' and over the Y carriage which is movably mounted on the X carriage 49'. The labelling head assembly is a standard label dispenser like the ones used in supermarkets and it puts a label on each cut part. The other side of the X carriage supports a holding bar 150 which is a toothed bar, sliding on bearings in a direction parallel to the direction of movement of the Y carriage along a Y axis and suction devices 152 and 153 are mounted on esach end of the bar 150. The length of the bar must be almost the same as the transverse width of the cutting area, and the suction devices are movable a short distance perpendicular to the cutting surface, for instance by means of a small pneumatic cylinder with the bar motion being controlled by another motor, such as an X or Y motor.

Figure 12:
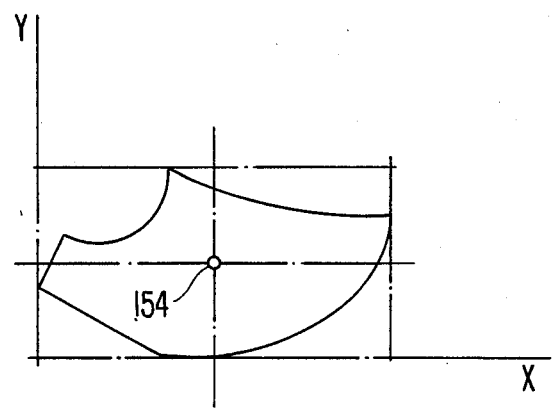
FIG. 12 illustrates the pattern cut by means of the system.

The operation of the removing device is as follows. First of all, the controller 18 stores all of coordinates for a cut part and it can calculate the coordinates of a rectangle which encloses the part, and then determines the midpoint 154 of the rectangle, as shown in FIG. 12. Usually this point will be on the part. If not, the problem is a little bit more difficult but possible to solve, and the present invention is not concerned with it. Then we will imagine the cutting area divided into two sections by an imaginary line 152 parallel to the X axis. If the midpoint 154 of the part to be taken out is for instance in the lower section of the removing area, then the bar 150 moves the suction device 152 to a position near the Y carriage 62', then the X-Y carriages are moved to place the suction device 152 just over the midpoint 154, the suction device is lowered by the cylinder (not shown) and once the part is held, then the Y carriage 62' moves to the lower side of the table (lower side in FIG. 11) and once it reaches the limit, then the bar 150 moves the suction device 152 over a stock area 160 at which the part is released. The stock area 160 is preferably a conveyor which is moving in the direction shown in FIG. 3.

Figure 13:
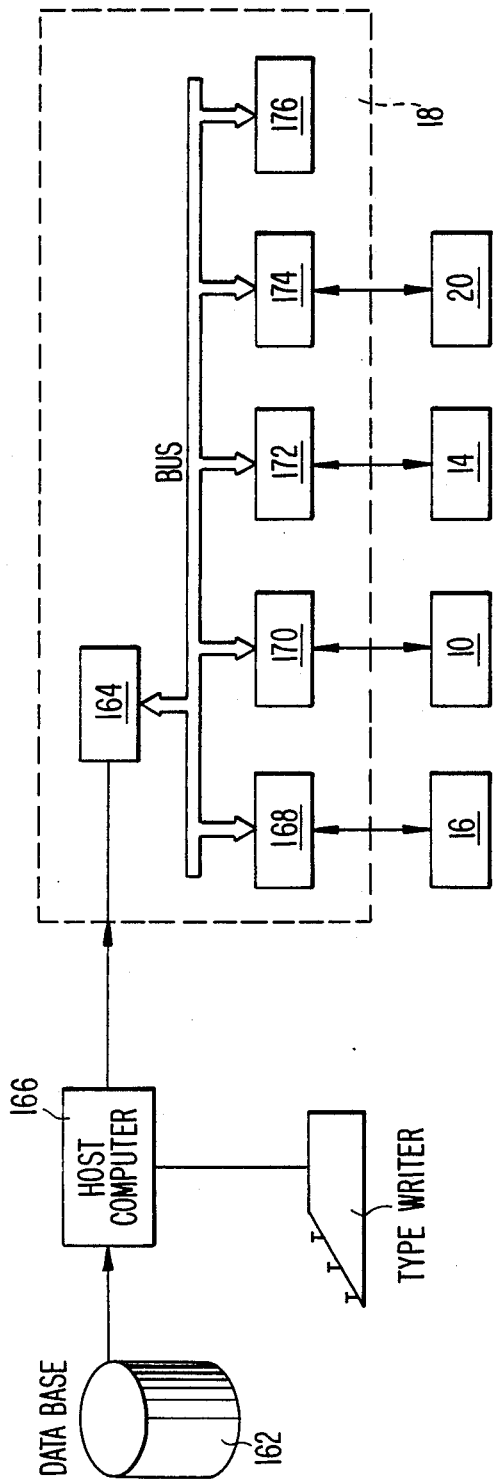
FIG. 13 is a block diagram of the controller illustrating the connection to the exterior world.

Finally, the machine controller 18, has a structure like the one shown in FIG. 13. Normally a host computer 166 receives data from a data base 162 and sends the data to the machine controller 18. The controller 18 includes a main CPU 164 which receives data from the computer 166 and manages the microprocessor of each part of the machine. These parts are a plasma jet control 168, a feeding assembly control 170, a cutting assembly control 172, a labelling and removing device control 174 and a control panel 176.

Figure 14:
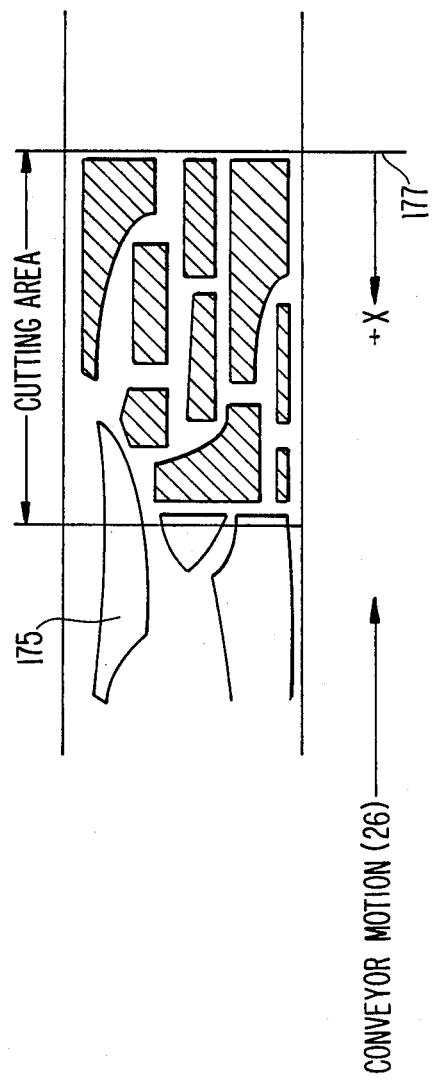
FIG. 14 is a plasma cutting area showing the cut and non-cut patterns.

During a working cycle, mainly the X-Y cutter assembly 14 with the plasma jet 106 works in parallel with the feeding assembly 10 and the labelling and removing device 20, then information for these independent areas is sent from the main CPU 164 to each controller. When it is necessary to move the conveyor, the main CPU 164 waits for the last device to complete its task and then the order to move the conveyor is sent. This is carried out by the cutting assembly controller 172 first engaging the brake 56, then disengaging the brake 50, then moving the X carriage 49 the distance ordered by the main CPU 164 (just until the next uncut part 175 with a smaller X coordinate reaches the downstream end 177 of the cutting zone, see FIG. 14). Note that this motion in the X-direction, must be subtracted from all the X coordinates sent from the host computer 166 to the controller 18, and this is very easily done by the main CPU 164 which, stores all the data.

Figure 15:
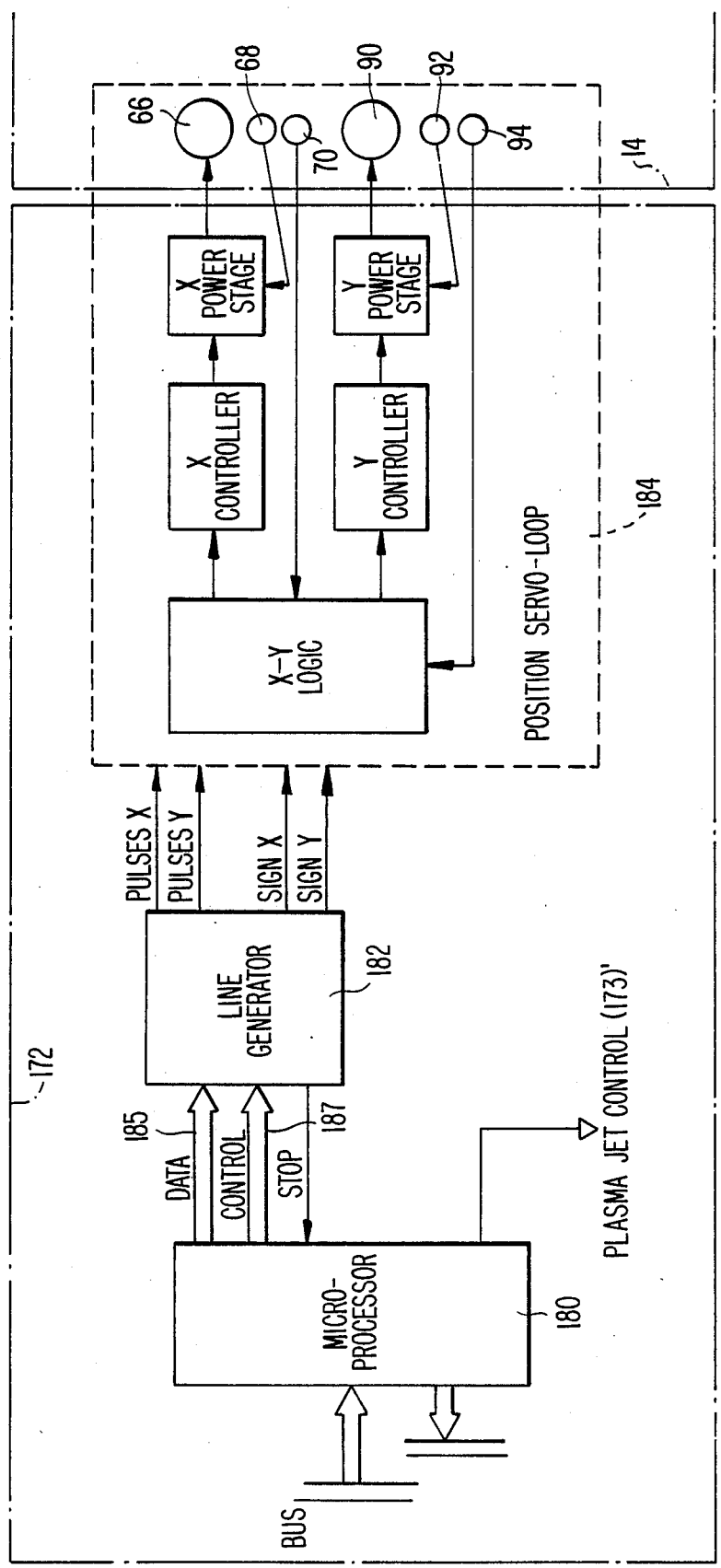
FIG. 15 is a block diagram of the X-Y controller.

As can be seen in FIG. 15, the cutting assembly control 172 is composed of a microprocessor 180, the line generator 182 and the position servo-loop 184. In an automatic mode, the microprocessor 180 receives data from the CPU 164, decodes and loads the data into the line generator registers in order to generate the line. When this is done, it sends a signal 173 to turn the plasma jet on and instruct the line generator that pulses must be sent to the servo-controller 184.

Figure 16:
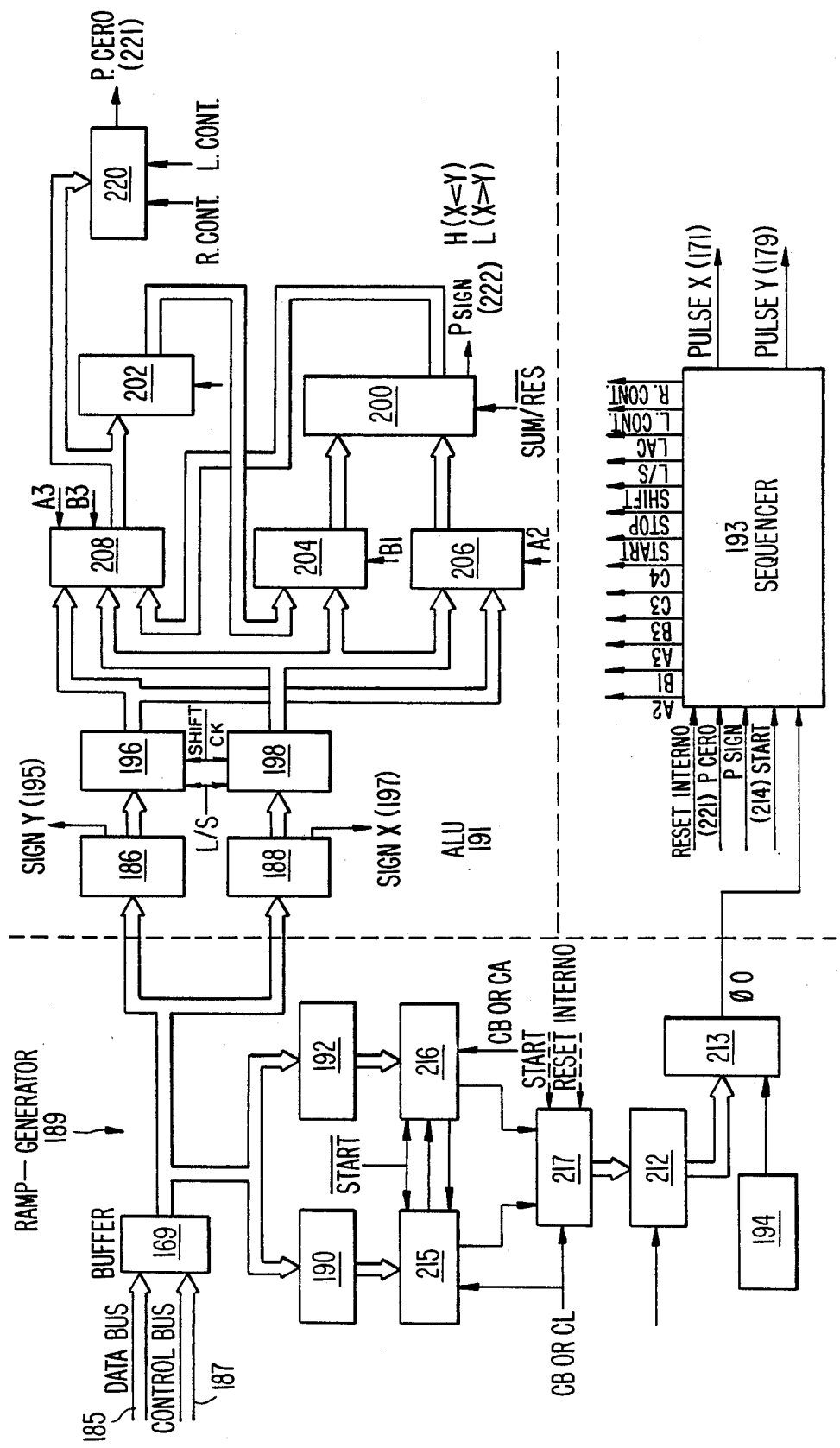
FIG. 16 is a block diagram of the microprocessor of the X-Y controller.

The line generator (FIG. 16) has 4, 16 bits registers, of which the 186 and 188 registers store the number of pulses necessary for movement in the X and Y directions. The 190 register stores the number of pulses necessary for movement during acceleration and the 192 register stores the number of pulses necessary for movement to a at constant speed. With this data, the line generator is able to send to the servo-controller 184 the exact number of pulses for each axis X and Y (signals 171 and 179), with its sign (signals 195 and 197) and just in time; if for instances the line has a slope of 30°, in other words X=2*Y, the line generator sends one pulse to the Y axis for each two pulses sent to the X axis.

The information mentioned above, reaches a buffer 169 of the line generator 182 through an 8 bits DATA BUS 185 and the registers, load control is done by a CONTROL BUS 187. The direction of motion of the motors (195 SIGN Y, 197 SIGN X) is represented by the most significant bit of the 186 and 188 registers.

In more detail, the line generator 182 has the following blocks (FIG. 16); an acceleration ramp generator 189, an ALU 191 and a sequencer 193. The ramp generator 189 varies the frequency of a clock signal 194 that controls the sequencer 192. With this frequency variation it is possible to change the time between pulses in order to accelerate or decelerate. The ALU 191 makes all the necessary arithmetic operations to generate the lines and the sequencer 193 generates signals to control the ALU and ramp generator cards and send the X and Y pulses.

In order to explain the operation of the sequencer 193, it is first of all necessary to define the signals reaching and leaving it.

C1, C2, C3, C4; are the four cycles of the sequencer 193.

$\phi 1, \phi 2, \phi 3, \phi 4$; are the four phases each cycle is divided into.

L/S: is the signal indicating to the X,Y shift registers 196, 198 if they must load or shift.

Shift CK: clock signal for shift registers, 196, 198.

LAC: Pulse to load an accumulator, 202. Lp LCONT: Pulse to load the ALU counter 220.

RCONT: Pulse to decrement by one the ALU counter 220.

Lbc: Pulse to set a bistable flip flop of the sequencer 193; this bistable flip flop indicates if the sequencer 193 must stop or not.

Lbs: Pulse to set the bistable flip flop of the sequencer 193; this bistable flip flop indicates if the prior subtraction result is positive or negative.

Lbd: Pulse to set the state bistable flip flop of the sequencer 193; this bistable flip flop indicates which is the dominant axis.

B1: signal to control a multiplexer 204.

A2: signal to control a multiplexer 206.

A3 and B3: signal to control a multiplexer 208.

SUM/RES: signal to control a ALU 200 to indicate if an addition or subtraction is going to be done.

STOP: signal to indicate to the microprocessor 180 that one line is finished.

START: signal generated by the microprocessor: 180 indicating to the line generator 182 that a straight line shall start. Such line data are stored into the LATCH registers 186, 188.

PCERO: signal 221 generated by the ALU 191 when the counter 220 reaches the zero value.

PSIGNO: signal generated by the ALU 200 indicating the result of the arithmetic operation just finished.

PX: Pulse to the X axis.

PY: Pulse to the Y axis.

Figure 17:
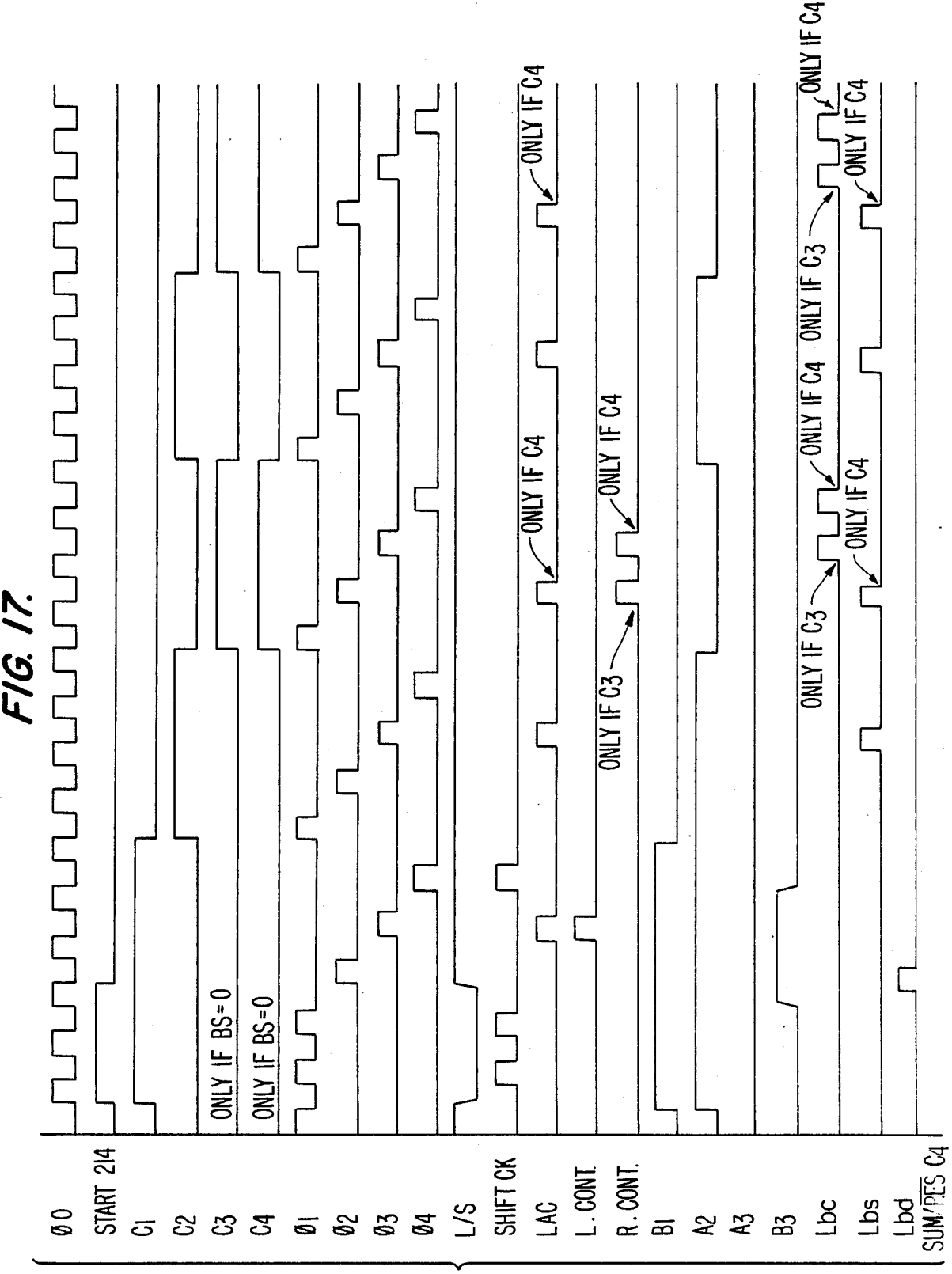
FIG. 17 is a cross diagram showing the signal evolution in the sequencer.

FIG. 17 shows a sequencer cronogram for the case in which the bistable flip flop of the dominant axis (BD) has a 0.

The sequencer 193 has 4 cycles (C1-C4) and each cycle is divided in 4 phases ($\phi 1$-$\phi 4$). The START signal given by the microprocessor 180, starts up the line generation process. First of all, the cycle C1 is performed, and the necessary signals to activate the following operations are given:

(a) The X, Y shift registers 196, 198, are loaded during $\phi 1$, L/S is in low level and the shift Ck is activated.

(b) In order to know what is the dominant axis, the information of the two shift registers 196,198 are subtracted; to do this, the signal B1 must be at high level, A2 at high level and SUM/RES at low level. During $\phi 2$, the bistable flip flop of the dominant axis B.D. is loaded activating Lbd with the sign of the subtraction result, indicating in this way what is the dominant axis.

(c) A3 and B3 take the adequate value to activate the multiplexer 208 in the way to permit the accumulator 202 and counter 220 being loaded with the dominant axis value.

(d) During $\phi 3$, LAC and LCONT are activated.

(e) The increments of X and Y are multiplied by 2, shifting during $\phi 4$ the values stored into the shift registers 196, 198. To do this, the signal L/S must be at high level and during $\phi 4$, shift CK is activated.

After C1, C2 is started and this cycle is repeated as many times as pulses are necessary to be done by the dominant axis. During this cycle, the following operations are done:

(a) The subtraction between the value of the accumulator 202 and twice the number of pulses the slave axis must move; this value is stored in one of the two shift registers 196, 198.

The signal B1 goes to low level and A2 at the level indicated by the bistable B.D. During $\phi 3$ Lbs and LAC are activated in order to load both the accumulator 202 and the bistable flip flop B.S.

If BS=0 the next cycle is C3, during which the following operations are performed:

(a) A pulse to the dominant axis is sent.

(b) The value of the counter 220 is decreased by one during $\phi 2$.

(c) The bistable flip flop B.C. is loaded with the value of the counter 220.

If BS=1 the next cycle is C4; this cycle is similar to C3 but in this case a pulse is sent to each axis.

If, after a cycle C3 or C4 is completed, BC indicates that the counter 220 has not reached a zero value, then the process is repeated starting from the C2 cycle. In case the counter has reached a zero value, the sequencer 193 is stopped and the STOP signal is generated.

The logic equations governing this signal are:

| | | |
|---|---|---|
| Shift CK | = | 01.C1 + 04.C1 |
| LAC | = | 02.C4 + 03.C2 + 03.C1 |
| LCONT | = | 03.C1 |
| RCONT | = | 02.C3 + 03.C4 |
| Lbc | = | 03.C3 + 04.C4 |
| Lbs | = | 02.C4 + 03.C2 |
| Lbd | = | 02.C1 |
| B1 | = | C1 |
| A2 | = | C1 + C2.$\overline{BD}$ + C4.BD |
| A3 | = | BD.C1 |
| B3 | = | $\overline{BD}$.C1 |
| SUM/RES | = | C4 |

Basically, the ALU 191 is a 16 bits ALU 200 with accumulator 202 and X,Y shift registers 196, 198. The multiplexers 204 and 206 enable the ALU 200 to choose the operands, and the multiplexer 208 permits loading the accumulator with the information of any one of the shift registers 196 and 198 or the ALU 200 output. As stated earlier, the LATCH X and Y registers 186 and 188 are to interface with the microprocessor 180. With these two registers, it is possible for the microprocessor and line generator to work in an asynchronous way.

The counter 220 of the ALU 191 is in charge of counting the number of pulses given to the dominant axis. We define the dominant axis of one given segment $\Delta S$ whose components along the axis are $\Delta X$, $\Delta Y$, as the one with longer length, and for the slave axis, the shorter one.

When the counter has reached the total number of pulses in the dominant axis, it sends a signal to the sequencer 193 through the line 221. In this way, the sequencer determines when the segment has been completed.

The line generator, executes the following algorithm:

```
Counter (220) = n. pulses dominant axis
Accumulator (202) = no. pulses dominant axis
    WHILE counter 22 > 0 DO
        BEGIN
        (1) Accumulator (202) = Accumulator (202)-(2*no.pulses slave axis)
            IF Accumulator (202) > 0      THEN
                                          (2) Pulse dominant axis
                                                  Counter (220) = Counter (220)-1
                                          ELSE
                                          (3) Pulse dominant axis
                                              Pulse slave axis
                                              Counter (220) = Counter (220)-1
                                              Accumulator (202) = Accumulator (202) + (2*no.
                                                  pulses dominant axis)
        END
```

The ALU 200, signals to the sequencer 193 the sign of the arithmetic operation made in (1) through the line 222. In this way the sequencer gives a pulse only in the dominant axis (2) or in both axes (3).

Now ramp generator 189 is explained. Each four cycles of the clock 194, the sequencer 193 sends a signal $P_X$ and/or $P_Y$. That is why by changing the clock frequency, it is possible to change the time between pulses and in turn, it is possible to accelerate and decelerate. The ramp generator 189 is in charge of changing this frequency. It is basically an N divider 213, where N is a digit put on its input. This digit can be dynamically changed, changing an address that is in the EPROM 212. This EPROM has stored in consecutive positions the desired acceleration ramp and works as follows. When the signal START 214 is done, accelerating counter 215 and a constant speed counter (A.C.) 216 are loaded with adequate values outputted from the respective registers 190 and 192. If the accelerating counter 215 is not equal to zero, the constant speed counter 216 is in an inhibited state, and a direction counter 217 is in the UP mode. Each time a signal 209 or 210 reaches to the A.C. 215, it is decremented and the direction counter 217 incremented, changing the EPROM output. When the A.C. 215 reaches the zero value, it permits the constant speed counter 216 to be decreased, changing its output and the direction counter to the inhibited state. Now, the constant speed counter 216 decreases in state when each signal 209 or 210 arrives at it and the direction counter is maintained unchanged. In this state neither the output of the divider 213 nor the frequency of the X, Y pulses change. In this state, the speeds of the X, Y motors are constant. When the constant speed counter reaches the zero value, it is inhibited and makes the direction counter 217 go to the down state. Now each signal 209 or 210 decreases the value of the direction counter 217 until it reaches the zero value that finishes the cycle.

I claim:

1. A process for cutting parts out of a sheet of material in which a cutting zone is provided with suction means for holding the sheet of material firmly against a surface of a conveyor located in said cutting zone and in which carriage means for supporting a cutting tool is movable above the cutting zone, the carriage means being controlled by programmed cutting instructions from controller means for moving the cutting tool along pattern coordinates of said parts, wherein the improvement comprises feeding the sheet material to be cut to the cutting zone by means of a gas permeable endless conveyor which comprises said conveyor, the surface of said conveyor supporting said sheet material during cutting thereof, and cutting complete parts out of said sheet material with a plasma arc cutting tool, said feeding of said sheet material being controlled by continuously advancing said conveyor in one step over a distance in a feed direction greater than the length in said feed direction of the longest complete part to be cut from said sheet material during said cutting step, said conveyor being held in a fixed position relative to said cutting zone during said cutting step when said plasma arc cutting tool is moved along said pattern coordinates, said feeding of said sheet material being performed by said carriage means engaging said conveyor and advancing said conveyor over said distance and said cutting of said sheet material being performed by releasing engagement between said carriage means and said conveyor to allow said carriage means to move said cutting tool along said pattern coordinates.

2. The improvement as claimed in claim 1, wherein said material is drawn from a roll of sheet material during said feeding step, said roll being supported on a rotatable roll support having means for maintaining a loop portion of said material hanging by gravity between said roll and said conveyor to thereby prevent stretching or distortion of said material on said conveyor due to movement of said material in said feed direction when said conveyor advances said material prior to said cutting step.

3. The improvement as claimed in claim 1, wherein prior to cutting said material is guided over a feeding zone adjacent said cutting zone, after which said material is successively guided over said cutting zone and a labelling and pickup zone, each of said zones having a length in said feed direction equal to the distance said conveyor is moved during said feeding step.

4. The improvement as claimed in claim 3, further comprising labelling cut parts when they have reached said labelling and pickup zone and picking up cut parts in said labelling and pickup zone and transferring them to a stock area.

5. The improvement as claimed in claim 1, wherein said material is moved by said conveyor during said feeding step solely by means of said suction means holding said material firmly against said conveyor which travels through said cutting zone and over said suction means.

6. An apparatus for cutting parts out of a sheet of material comprising:
a cutting zone;
an endless gas permeable conveyor movable in a feed direction along said cutting zone for supporting said material thereon;
suction means disposed in said cutting zone for applying a vacuum to said conveyor and holding said material firmly against said conveyor during a feeding step and a cutting step;
cutting tool means disposed along said feed direction for cutting parts from said material supported on said conveyor, said cutting tool means including a plasma arc cutter;
carriage means disposed along said feed direction for supporting said cutting tool means and moving said plasma arc cutter along pattern coordinates of said parts;
means for engaging said carriage means with said conveyor for selectively advancing said conveyor along said feed direction a distance greater than the length in said feed direction of the longest part to be cut from said material during a cutting step;
controller means for storing pattern coordinates of said parts, said controller means being operatively connected to said carriage means to control movement of said carriage means said distance along said feed direction during a feeding step and to control movement of said carriage means such that said plasma arc cutter follows said pattern coordinates during a cutting step, said controller being further operatively connected to said engaging means for engaging said carriage means with said conveyor during a feeding step and for disengaging said engaging means with said conveyor prior to a cutting step.

7. The apparatus of claim 6, further comprising roll support means for supporting a roll of said material disposed adjacent an upstream end of said conveyor, said roll support means including means for driving said roll to maintain a loop of said material hanging by gravity between said roll support means and said upstream end of said conveyor, said means for driving said roll including a motor on said roll support means and sensor means for detecting an upper and lower position of the bottom of said loop, said sensor means being operatively connected to said motor to maintain said bottom of said loop between said upper and lower positions.

8. The apparatus of claim 7, wherein said engaging means comprises a brake means mounted on said carriage means, said brake means being actuated by said controller means to engage means on said conveyor whereby said conveyor is movable together with said carriage means along said feed direction to advance said material to said cutting zone and to advance parts which have been cut to a labelling and pickup zone downstream of said cutting zone.

9. The apparatus of claim 6, further comprising labelling and pickup means disposed along said feed direction for labelling cut parts and for removing cut parts from said cutting zone, said controller means being operatively connected to said labelling and pickup means for controlling operation thereof.

10. The apparatus of claim 7, wherein said conveyor is movable along a feeding zone and said cutting zone, each of which has substantially the same length along said feed direction, said suction means being provided below an upper surface of said conveyor in said feeding zone and in said cutting zone.

11. The apparatus of claim 8, wherein said carriage means includes an X carriage which extends perpendicularly to said feed direction and moves parallel to said feed direction, said brake means including a brake mounted on each opposite end of said X carriage, said means on said conveyor comprising an upwardly extending flange on each opposite side thereof, each said flange being engageable with a respective said brake upon actuation thereof by said controller means.

12. The apparatus of claim 11, wherein said carriage means includes a guide rail on each opposite side of said conveyor, said X carriage being movable along each said guide rail and said carriage means including endless toothed belts rotatably supported for movement back and forth along said feed direction, said belts being fixed to said X carriage for movement therewith and at least one of said belts being driven by motor means operatively connected to said controller means whereby movement of said X carriage along said feed direction is precisely controlled.

13. The apparatus of claim 12, wherein said carriage means further comprises a Y carriage movably supported on said X carriage for movement back and forth in a direction perpendicular to said feed direction, said plasma arc cutter being mounted on said Y carriage.

14. The apparatus of claim 13, wherein said carriage means includes a drive pulley disposed at one end of said X carriage and a tension pulley disposed at the other end of said X carriage, an endless toothed belt supported on said drive pulley and said tension pulley, said Y carriage being fixed to said toothed belt for movement therewith, and a motor means for rotating said drive pulley, said motor means being operatively connected to said controller means whereby movement of said plasma arc cutter perpendicular to said feed direction is precisely controlled.

15. The apparatus of claim 9, wherein said labelling and pickup means includes a labelling head assembly for dispensing labels on cut parts and at least one suction device for picking up individual cut parts, said labelling head assembly and said suction device being mounted on support means movable back and forth along said feed direction and back and forth along a direction perpendicular to said feed direction.

16. The apparatus of claim 15, wherein said support means includes an X carriage extending perpendicularly to said feed direction and movable back and forth along said feed direction and a toothed bar supported on said X carriage for movement back and forth along said direction perpendicular to said feed direction, said at least one suction device comprising a suction nozzle mounted at each opposite end of said toothed bar, each suction nozzle being movable towards and away from said conveyor for picking up cut parts thereon.

* * * * *